3,306,737
MAGNESIUM AND RARE EARTH METAL CONTAINING PREALLOY FOR THE TREATMENT OF IRON AND STEEL MELTS
Horst Mühlberger, Frankfurt am Main, Germany, assignor to Metallgesellschaft Aktiengesellschaft, Frankfurt am Main, Germany, and Suddeutsche-Kalkstickstoff-Werke Aktiengesellschaft, Trostberg, Upper Bavaria, Germany
No Drawing. Filed Sept. 4, 1963, Ser. No. 306,628
Claims priority, application Germany, Sept. 20, 1962, M 54,273
1 Claim. (Cl. 75—134)

The present invention relates to improved prealloys for the treatment of iron and steel melts for the production of cast iron with spheroidal graphite, for the deoxidation or desulfurization of cast iron, as well as for the deoxidation of steels and for the production of semi steels in which the graphite which separates out upon cooling is in spheroidal form.

Prealloys containing up to 40% of magnesium, various amounts of calcium and the remainder essentially silicon and, if desired, iron have been used for the treatment of iron and steel melts, especially for the introduction of magnesium in the production of cast iron with spheroidal graphite. It is furthermore known to add rare earth metals, especially misch metal, to cast iron melts from which cast iron with spheroidal graphite is to be produced. Such additions of rare earth metals in large quantities are supposed to cause formation of spheroidal graphite as in the addition of magnesium, however, the processes employing addition of such rare earth metals have not been introduced in practice. In addition, small quantities of rare earth metals have been used in combination with magnesium in such a way that the magnesium causes the formation of the spheroidal graphite whereas the rare earth metals serve to counteract the action of disturbing elements, such as titanium, which in certain instances hinder the formation of spheroidal graphite.

According to the invention it was found that prealloys with a relatively high magnesium content of 20 to 50% and a content of rare earth metals which at 5 to 25% is higher than that customarily contained in prealloys which simultaneously contain magnesium are especially advantageous for the treatment of iron and steel melts and especially for the formation of spheroidal graphite in cast iron. It is critical for the prealloys according to the invention that a specific ratio is maintained between the magnesium and the rare earth metal content which lies between 2:1 and 4:1. The prealloys according to the invention must also contain at least 40% of silicon and/or nickel and/or copper and as a remainder, if desired but not necessarily, iron and/or manganese and/or calcium. When the prealloy also contains calcium to reduce the burn off rate of the magnesium in the melt its quantity must be sufficiently low that the ratio of magnesium to calcium is greater than 8:1. Preferably, the prealloys according to the invention contain 25 to 40% of magnesium and 6 to 20% of rare earth metals, the ratio between the magnesium and rare earth metals being maintained within the ranges indicated above. In the above and in the following the proportions of the prealloy components are given by weight unless otherwise indicated.

The prealloys according to the invention, in addition to being suited for the production of cast iron with spheroidal graphite, are also suited for the deoxidation and desulfurization of cast iron without striving for the formation of spheroidal graphite. In addition, the prealloys can be used to treat the so-called semi steels with a carbon content between 0.9 and 1.7% in order that the graphite which separates out on cooling separates out in spheroidal form, whereby the strengths and toughness are especially improved. Finally, the prealloys according to the invention can also be used for the deoxidation of steels, especially high alloy steels with high nickel and chromium contents. The use of such prealloys in this manner leads to an especially high toughness and therefore to better workability and malleability. Nickel containing prealloys according to the invention are especially suited as they simultaneously can serve to introduce the desired nickel into the steel.

In use of the prealloys according to the invention it was unexpectedly found that due to the presence of the rare earth metals the magnesium yield (effectiveness) of the prealloys is increased very substantially. The cause therefor is not fully understood. The increases in yields from the magnesium in the alloys according to the invention in individual cases amounted up to 80% and as an average are between 40 and 70%. As a result, substantially lower quantities of the prealloy for the treatment of iron and steel melts suffice than when the same alloys are used but without a rare earth metal content. The decrease in the quantity of the prealloy required not only results in the saving engendered by the use of such smaller quantities but also decreases the temperature loss engendered by the addition of the prealloy. In addition, a too rapid decline in the effectiveness of the magnesium treatment is avoided and consequently the melt can be cast over a longer period of time.

The increase in magnesium yield is of advantage in all instances in which the prealloys according to the invention can be used. This is also true when they are used for the deoxidation and desulfurization of cast iron or for the deoxidation of steels when formation of spheroidal graphite is not striven for as in these cases also the quantity of rare earth metal containing alloy required to obtain the same effect is less than when the prealloy does not contain the rare earth metal. The increase in magnesium yield is of great significance in the treatment of semi steels and the deoxidation of steels in view of the high treating temperatures of over 1570° C. In view of the rare earth metal content the magnesium is more strongly bound which results in that the magnesium vaporization is under better control and that the reaction proceeds under better control so that the use of such prealloys is easier.

It is critical for the prealloys according to the invention that the indicated ratio between the magnesium and the rare earth metals be maintained. If the ratio is too low or, in other words, the quantity of rare earth metals in relation to the magnesium content is too high, certain and complete spheroidal graphite formation can no longer be attained, especially when cast iron with a high sulfur content is to be treated. In addition, in all applications, the reaction of the magnesium, especially in large charges, is retarded too much whereby the reaction products are no longer reliably removed from the melt. If the proportion of the rare earth metals is below that indicated, the advantages described above, especially the increase in magnesium yields, are not attained.

The prealloy according to the invention can be incorporated in the iron or steel melts by submerging them in such melts, for example, with the aid of an immersing bell to near the bottom of a casting ladle which preferably is considerably higher than it is wide. This method of introducing the prealloy in the melt is especially suited in the treatment of cast iron melts with a high sulfur content.

The rare earth metals are present in the prealloys in metallic form and in general are lanthanides, primarily as cerium and lanthanum. They are best introduced into the prealloys during the production of the latter in a known manner by reduction of rare earth metal compounds.

The following examples will serve to illustrate the increase in magnesium yield in prealloys according to the invention in the production of cast iron containing spheroidal graphite.

Two different prealloys were employed which essentially only differ in their rare earth metal content. They were of the following compositions:

|  | Known alloy, Percent | Alloy according to invention, percent |
|---|---|---|
| Mg | 30–32 | 30–32 |
| Fe | 5–7 | 5–7 |
| Ca | 4–5 | 3–4 |
| Rare earth metals (micsh metal) | 1–1.5 | 9–10 |
| Si | (¹) | (¹) |

¹ Remainder.

Both prealloys were immersed into 800 kg. of a cast iron melt contained in a slim ladle at 1480–1500° C. with the aid of an immersing bell and the thus treated melts subsequently cast.

The results obtained are given in the following table in which $S_R$ = Sulfur in iron, taken from the tap spout
$S_{SG}$ = Sulfur in cast iron
VL–Z = Quantity of prealloy added
Mg = Magnesium content in cast iron
Mg–A = Magnesium yield In Examples 1–4 the known prealloy was used whereas in Examples 5–12 the prealloy according to the invention was used.

TABLE

|  | $S_R$, percent | $S_{SG}$, percent | VL–Z (kg.) | Mg, percent | Mg–A, percent |
|---|---|---|---|---|---|
| 1 | 0.035 | 0.006 | 6.0 | 0.054 | 34.7 |
| 2 | 0.032 | 0.009 | 6.0 | 0.058 | 35.4 |
| 3 | 0.030 | 0.008 | 7.0 | 0.060 | 30.6 |
| 4 | 0.027 | 0.007 | 6.0 | 0.054 | 32.0 |
| 5 | 0.024 | 0.009 | 5.6 | 0.066 | 40.7 |
| 6 | 0.025 | 0.008 | 4.8 | 0.063 | 45.5 |
| 7 | 0.036 | 0.015 | 4.0 | 0.051 | 52.0 |
| 8 | 0.046 | 0.016 | 4.8 | 0.056 | 50.5 |
| 9 | 0.046 | 0.018 | 4.8 | 0.059 | 52.3 |
| 10 | 0.044 | 0.019 | 4.8 | 0.059 | 51.0 |
| 11 | 0.036 | 0.022 | 3.2 | 0.036 | 56.0 |
| 12 | 0.034 | 0.021 | 2.4 | 0.030 | 61.0 |

It can be seen from the above table that with the prealloys according to the invention the magnesium yield in the extreme was raised from 30.6% to 61% and therefore was raised over 100%. The average increase in yield amounts to about 60%. The quantity of prealloy required could be reduced up to below one-half and as an average to 60–70%.

We claim:

A prealloy adapted for the treatment of iron and steel melts essentially consisting of 30–32% of magnesium, 5–7% of iron, 3–4% of calcium, 9–10% of rare earth metals and the remainder silicon.

References Cited by the Examiner

UNITED STATES PATENTS

| 2,762,705 | 9/1956 | Spear et al. | 75—130 |
| 2,792,300 | 5/1957 | Livingston | 75—168 X |
| 2,837,422 | 6/1958 | Motz et al. | 75—134 |
| 3,030,205 | 7/1959 | Millis | 75—168 X |
| 3,033,676 | 5/1962 | Cox | 75—130 |

DAVID L. RECK, *Primary Examiner.*

C. N. LOVELL, *Assistant Examiner.*